Figure 1:
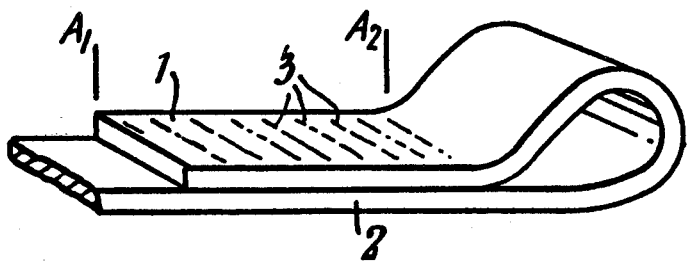

United States Patent [19]

Stonebridge

[11] 4,137,352
[45] Jan. 30, 1979

[54] METHODS OF MAKING LOOPS IN STRIP FABRIC MATERIAL

[75] Inventor: Arthur L. Stonebridge, Bradford, England

[73] Assignee: BBA Group Limited, England

[21] Appl. No.: 203,411

[22] Filed: Nov. 30, 1971

Related U.S. Application Data

[63] Continuation of Ser. No. 804,582, Mar. 5, 1969, abandoned.

[30] Foreign Application Priority Data

Mar. 13, 1968 [GB] United Kingdom ............... 12207/68

[51] Int. Cl.² ............................................. B32B 3/06
[52] U.S. Cl. .................................... 428/102; 112/440; 428/121; 428/124; 428/284
[58] Field of Search .................... 161/102–109, 161/50, 51, 52, 107; 156/93; 28/47, 77; 24/265, 67; 112/440; 428/121, 126, 131, 102, 124, 284

[56] References Cited

U.S. PATENT DOCUMENTS

| | | | |
|---|---|---|---|
| 626,196 | 5/1899 | Thompson | 24/265 |
| 2,005,569 | 6/1935 | Smith | 24/73 |
| 2,120,458 | 6/1938 | Bodle | 161/52 |
| 2,372,632 | 3/1945 | Webb | 161/51 |
| 2,458,500 | 1/1949 | Bertrand et al. | 161/50 |
| 2,475,277 | 7/1949 | Budnik | 161/107 |
| 2,988,457 | 6/1961 | Gatcomb | 117/68 |
| 3,175,862 | 3/1965 | Robbins | 297/385 |
| 3,804,698 | 4/1974 | Kinloch | 161/7 |

*Primary Examiner*—James J. Bell
*Attorney, Agent, or Firm*—Stevens, Davis, Miller & Mosher

[57] ABSTRACT

A strip fabric material such as an aircraft arrester tape includes a loop formed by securing the end of the fabric material to the body of the fabric material by a joint which includes an additional layer having a thickness which has a relationship to the thickness of the strip fabric material itself lying in the range of ratios from 2:1 to 1:2. The additional layer may be of fabric material or of a cementing adhesive and there may be one or more additional layers, particularly when a fabric material is used.

13 Claims, 9 Drawing Figures

METHODS OF MAKING LOOPS IN STRIP FABRIC MATERIAL

This is a continuation, of application Ser. No. 804,582, filed Mar. 5, 1969 now abandoned.

This invention relates to methods of making loops in strip fabric material such as tapes, belts and webbing. The invention has application chiefly in the manufacture of loops in high strength strip fabric material where the loop is also required to be of high strength, for example in the production of lifting slings or aircraft arrester tapes.

The usual method of making the loop is by bending the end of the strip fabric material over on to itself and sewing the end down on to the body of the material. This is the only method now in use for making loops in aircraft arrester tapes.

Figure 2:
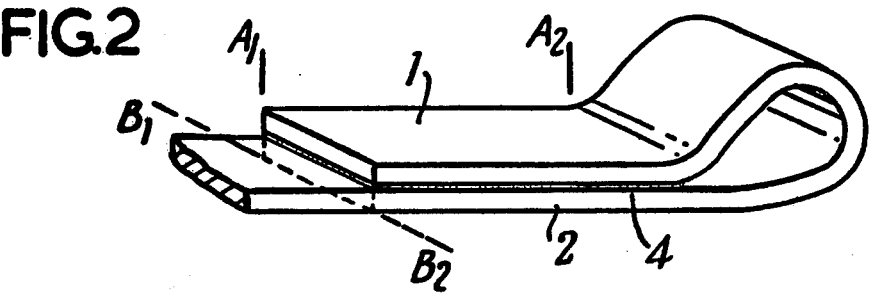

In the explanation of the invention which will be given reference will be made to examples of the known method of making loops in aircraft arrester tapes and the figures of the accompanying drawings include an illustration of the prior art as well as illustrations of embodiments of the present invention. In the drawings:

FIG. 1 shows an end portion of an aircraft arrester tape having a loop formed by the conventional method now in use;

FIG. 2 is a similar view of an aircraft arrester tape having a loop formed by an alternative method to that shown in FIG. 1, which method is believed to be obvious if not already known, and which method gives results worse than those obtained using the method of FIG. 1, and FIGS. 3 to 9 are similar to FIG. 1, but each showing an end portion of an aircraft arrester tape having a loop formed by a method in accordance with the present invention.

Referring to FIG. 1 of the accompanying drawings, a typical sewn loop is shown in which the end 1 of the strip fabric material is bent back on to the main body 2 of the material and the loop is formed by stitching the end 1 to the body 2 over the sewn area between $A_1$ and $A_2$ as indicated by the rows of stitching 3. When the strip fabric material is to be used as an aircraft arrester tape, the length of the sewn area $A_1A_2$ is usually of the order of two feet. This relatively long sewn area, which constitutes the joint, is partly to provide some insurance against possible mechanical damage to some part of the stitching. It also attempts to distribute the load over a length of the strip fabric material, but it is in practice impossible to ensure that, when the loop is subjected to a tensile stress, the tensile load is distributed evenly over the sewn length $A_1A_2$. In fact it is found that, when a fabric material including a loop is tested to destruction, the break usually occurs in the main body 2 of the material within about two or three inches of the end $A_1$ of the sewn area. The best strength that has been achieved hitherto in a strip fabric material including a loop is about 80% of the strength of the strip fabric material without a loop.

An obvious alternative method of making such loops is the use of a cementing adhesive, for example a rubbery type cement, to make the joint instead of using sewing with rows of stitching. Experiments have been made using a high strength cement of the polyurethane rubber type and a loop formed in this way is shown in FIG. 2 of the accompanying drawings. The cement layer which joins the end 1 to the body 2 of the strip fabric material is a thin layer indicated at 4. When this simple cemented joint is tested, it gives inferior results to the sewn joint illustrated in FIG. 1, the average strength of the strip fabric material including a loop formed with the cemented joint of FIG. 2 being 64% of the strength of the strip fabric material per se.

It is believed that this low figure of the strength of a strip fabric material including a loop made with a cemented joint is due to stress concentration along the line $B_1B_2$ in FIG. 2.

It is a main object of the present invention to improve the obtainable strength of a strip fabric material including a loop by reducing the stress concentration which occurs in the fabric material as a result of the formation of the loop. In accordance with the present invention there is provided a method of making a loop in strip fabric material such as tapes, belts and webbing comprising the steps of bending over an end of the fabric material and securing the end to the body of the fabric material to form a joint, characterised in that the joint includes an additional layer comparable in thickness to the thickness of the fabric material. In the embodiments of the invention which will be described with reference to FIGS. 3 to 8 of the accompanying drawings, the additional layer is not thicker than the fabric material, and there may be more than one additional layer present.

Advantageously the stress concentration may be substantially reduced by distributing the load over a longer length than the length of the joint formed between the end and the body of the strip fabric material. In accordance with one preferred aspect of this feature of the invention, the additional layer is an additional layer of strip fabric material which extends over the whole length of the joint and for some distance beyond it in a direction away from the loop, and which is also secured to the body of the strip fabric material on the side of the joint remote from the loop. Alternatively there may be more than one additional layer of strip fabric material and all the additional layers may extend over an area of the joint and also for some distance beyond the joint in a direction away from the loop. Advantageously the strip fabric material which constitutes the additional layer or layers is of a fabric material which gives a greater extension for a given base load than the fabric material in which the loop is being formed.

The additional layer or layers of fabric material may be present in the joint between the end and the body of the strip fabric material or, alternatively, one or more layers may be present in the joint as an overlay covering the end which is secured to the body in the joint.

The securing of the layers of fabric material to form the joint and the securing of the additional layer to the body beyond the joint may be effected by stitching, or by using a cementing adhesive, or by using a cementing adhesive and stitching.

Instead of the additional layer being an additional layer of fabric material it may be a layer of cementing adhesive of a thickness of not less than ⅛ of an inch, the said layer of cementing adhesive securing the end of the strip fabric material to the body of the material. When it is intended to distribute the load over a longer length than that of the actual joint, the layer of cementing adhesive may extend beyond the joint on the side remote from the loop. Stitching may be provided through the joint including the end and the body of the strip fabric material and the layer of cementing adhesive.

Preferably the cementing adhesive comprises polyurethane.

The relationship between the thickness of the intermediate layer or layers and the thickness of the fabric material in which the loop is being formed may be in the range of ratios from 2:1 to 1:2.

The present invention further comprehends a strip fabric material, for example an aircraft arrester tape, including a loop made by a method in accordance with the invention.

The invention will be more clearly understood from the following detailed description which is made with reference to FIGS. 3 to 9 of the accompanying drawings which show alternative embodiments of the invention.

Figure 3:
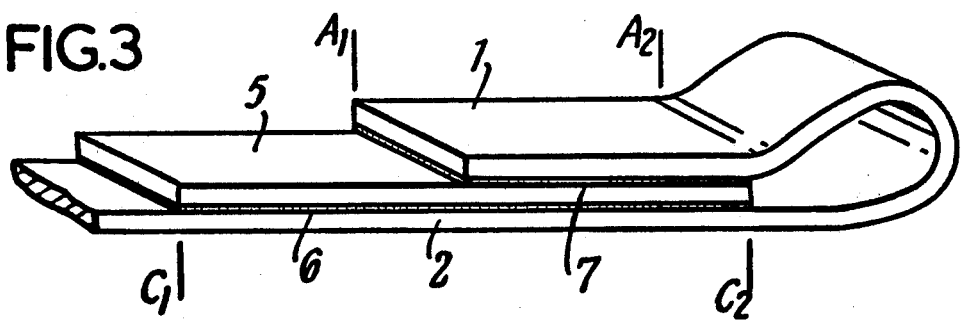

A preferred method of making a loop in strip fabric material in accordance with the present invention is illustrated in FIG. 3. An intermediate layer 5 of strip fabric material having a high tensile strength and a high elongation at break is inserted in the joint, which is of the cemented type illustrated in FIG. 2. The intermediate layer 5 of strip fabric material may be of the same thickness as the fabric material from which the loop is being formed, or it may be thinner. As one example, a fabric material having a thickness of approximately 3/16 of an inch was used for the intermediate layer 5 when the thickness of the fabric material comprising the end 1 and the body 2 was ¼ of an inch. The same thickness of intermediate layer 5 was also used successfully with a fabric material of 340 thou thickness comprising the end 1 and the body 2. The intermediate layer 5 of strip fabric material has a length $C_1C_2$ greater than the length of the overlap of the end 1 of the strip fabric material on the body 2 of the strip fabric material in the formation of the joint, and the purpose of this greater length of the intermediate layer 5 is to spread the shear load over an area greater than the area of the length $A_1A_2$. Two thin layers of cement 6 and 7 are used between the intermediate layer 5 and the body 2, and the intermediate layer 5 and the end 1 respectively.

Tests of a number of loops made by this improved method, using an intermediate layer of fabric having a thickness relationship to the thickness of the fabric material comprising the end 1 and the body 2 in the range of ratios from 1:1 to 1:2, gave an average tensile strength for the strip fabric material including the loop of 90% of the strength of the strip fabric material per se. There is therefore a marked improvement over the value of 64% found for the material having a loop formed by a conventional cemented joint, and the strength is also appreciably better than the figure of 80% given by the material having a loop formed by a conventional sewn joint.

Figure 4:
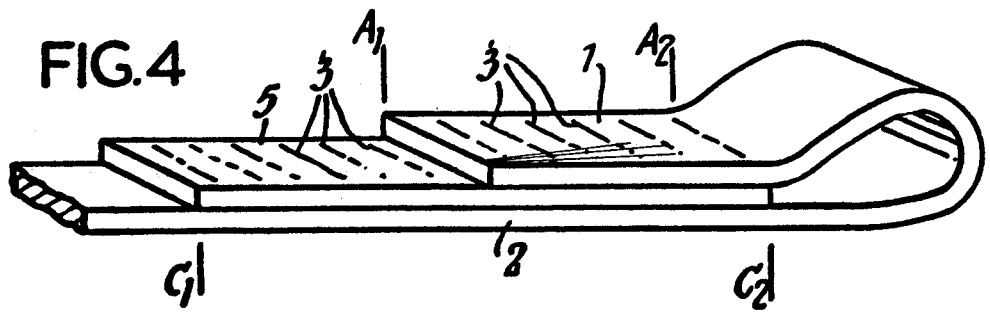

In FIG. 4 there is shown a loop formed on the same principle as FIG. 3, but with the joint formed with rows of stitching 3 instead of by the use of cementing adhesive. The length of the intermediate layer 5 which extends beyond the joint is also secured to the body 2 of fabric material by rows of stitching 3. The stitching at the actual joint between $A_1$ and $A_2$ is made through three thicknesses of strip fabric material.

Figure 5:
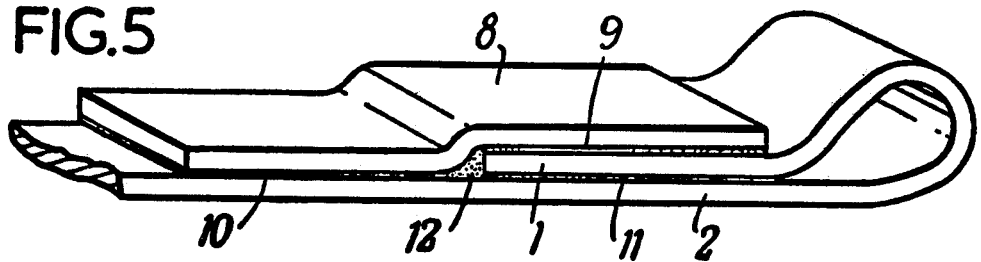

Another alternative embodiment of the invention is shown in FIG. 5. In this case, instead of an intermediate layer 5 of strip fabric material, an overlay 8 of strip fabric material with high tensile strength and high elongation at break is provided. The length of the strip fabric material from which the overlay 8 is formed is greater than the length of the joint $A_1A_2$, and the overlay is cemented to the top of the end 1 by a thin layer of cement 9, is also cemented to the body 2 of strip fabric material by a thin layer of cement 10, and the end 1 is cemented to the body 2 by a thin layer of cement 11. The thin layers of cement 9, 10 and 11 coalesce at 12 to form a filling layer under the overlapped fabric material at the end of the joint.

Figure 6:
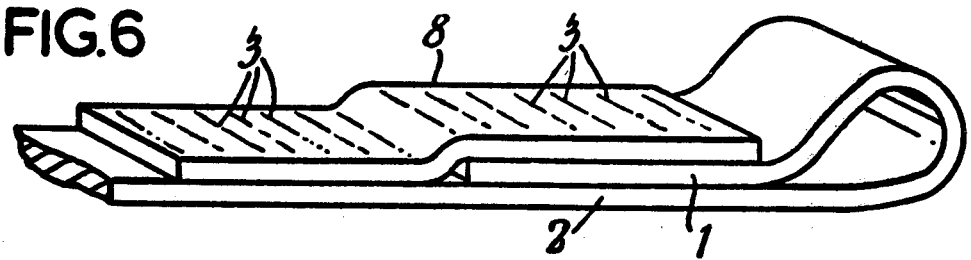

As illustrated in FIG. 6, the method incorporating the overlay 8 may be adapted to a sewn joint using rows of stitching 3 in a manner similar to that already described with reference to FIG. 4.

Figure 7:
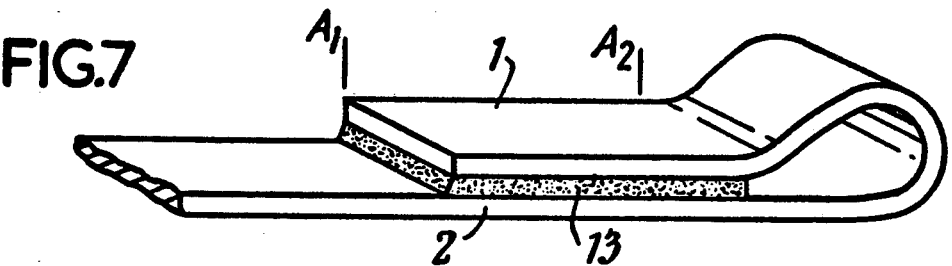

Instead of providing an additional layer of fabric material, an additional layer may be effectively produced by making the layer of cementing adhesive thicker, so that the cementing adhesive itself acts as an intermediate layer. This embodiment of the invention is shown in FIG. 7 and the layer 13 of the cementing adhesive must be not less than 1/8 of an inch in thickness, so that the shear strain in the layer of cementing adhesive under tension helps to spread the load over a length of the strip fabric material.

Figure 8:
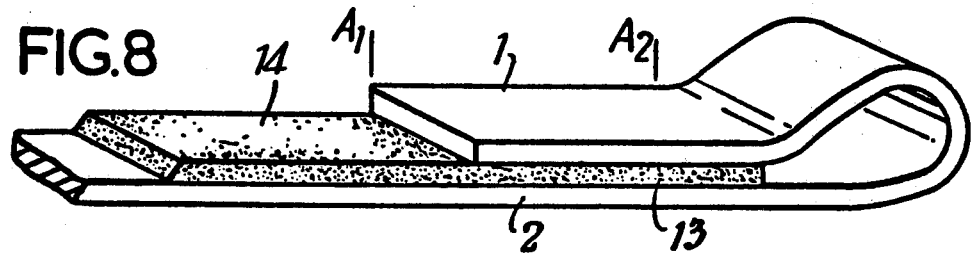

Advantageously the layer 13 of the cementing adhesive, which is preferably a rubbery cement, for example a cement based on polyurethane, may be extended beyond the area $A_1A_2$ of the joint in a direction away from the loop as indicated at 14 in FIG. 8.

When a cementing adhesive is used in making the joint, it must be strong and flexible. In particular, the cementing adhesive must have a high peel strength because bending moments are caused when the loop is subjected to tensile loads.

Curable polyurethane is the preferred adhesive because of its high mechanical strength, high elongation, and good adhesive properties. Other adhesives, in particular those based on natural rubber or synthetic elastomers such as nitrile or chloroprene rubbers, can be used.

Figure 9:
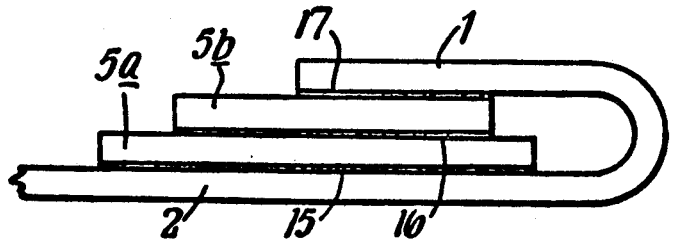

In FIG. 9 there is shown one example of a loop made in strip fabric material using more than one additional layer of fabric material in the joint. FIG. 9 illustrates a loop in which two intermediate layers $5a$ and $5b$ of strip fabric material are interposed between the end 1 and the body 2. Each of the intermediate layers $5a$ and $5b$ of fabric material is of a similar thickness to the thickness of the strip fabric material comprising the end 1 and the body 2 from which the loop is formed.

In FIG. 9 the intermediate layer $5b$ which is shown as nearer to the end 1 of the strip fabric material is of a lesser length than the intermediate layer $5a$ which is adjacent to the body 2 of strip fabric material. However both the intermediate layers $5a$ and $5b$ extend over the area of the joint between the end 1 and the body 2 of strip fabric material and also for some distance beyond the joint in a direction away from the loop.

The joint is formed in the embodiment of the invention illustrated in FIG. 9 by the use of thin layers 15, 16 and 17 of appropriate cementing adhesive, although stitching could equally well be used, or a combination of stitching and cementing adhesive, as previously mentioned.

In the case of aircraft arrester tapes, the use of sewn joints in the formation of the loop have the disadvantage that heavy sewing machines are needed, so that it is necessary to make the loops at a factory. By contrast, cemented joints can be made, with fairly simple equipment, on site at the airfield.

I claim:
1. A high-strength strip fabric material for aircraft arrester tapes, having a high strength single loop therein, comprising an end of a single thickness of aircraft arrester tape fabric material turned back upon itself and fixedly secured to the body of the fabric material by at least one means selected from the group consisting of stitching and adhesive cement to form a joint, characterized in that the joint includes an additional layer of at least one material selected from the group consisting of fabric material and adhesive cement which is fixedly secured to said end and to said body by said means and located between said end and said body, which gives a greater extension for a given base load than the fabric material in which the loop is formed, the relationship between the thickness of the additional layer and the thickness of the fabric material of the strip being in the range of ratios from 2:1 to 1:2.

2. A high-strength strip and loop according to claim 1, wherein the additional layer is an additional layer of strip fabric material.

3. A high-strength strip and loop according to claim 1, wherein the additional layer is an additional layer of strip fabric material which extends over the whole length of the joint and for some distance beyond it in a direction away from the loop, and which is also secured to the body of the strip fabric material on the side of the joint remote from the loop.

4. A high-strength strip and loop according to claim 2, wherein the additional layer comprises a plurality of additional layers of fabric material.

5. A high-strength strip and loop according to claim 4, wherein the plurality of additional layers of strip fabric material extend over the whole length of the joint and for some distance beyond it in a direction away from the loop, the additional layers being also secured to the body of the strip fabric material on the side of the joint remote from the loop.

6. A high-strength strip and loop according to claim 5, wherein that part of the joint between the end and the body of the strip fabric material includes a thickness of each additional layer of fabric material present in the joint.

7. A high-strength strip and loop according to claim 3, wherein the layers of fabric material to form the joint and the additional layer to form the body beyond the joint are stitched together.

8. A high-strength strip and loop according to claim 3, wherein the layers of fabric material to form the joint and the additional layer to form the body beyond the joint are secured together with a cementing adhesive.

9. A high-strength strip and loop according to claim 3, wherein the layers of fabric material to form the joint and the additional layer to form the body beyond the joint are secured together with a cementing adhesive and stitching.

10. A high-strength strip and loop according to claim 1, wherein the additional layer is a layer of cementing adhesive of a thickness of not less than 150 of an inch, the said layer securing the end to the body of the fabric material.

11. A high-strength strip and loop according to claim 10, wherein the layer of cementing adhesive extends beyond the joint on the side remote from the loop.

12. A high-strength strip and loop according to claim 10, wherein the joint includes stitching through the end and the body of the fabric material and through the layer of cementing adhesive which is present between the end and the body.

13. A high-strength strip and loop according to claim 10, wherein the cementing adhesive comprises polyurethane.

* * * * *